Nov. 19, 1968     C. E. CAPADALIS     3,411,798
MATERIAL HANDLING MEANS
Filed June 8, 1966     2 Sheets-Sheet 1
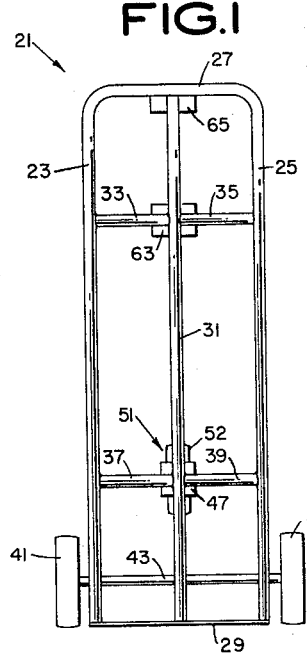
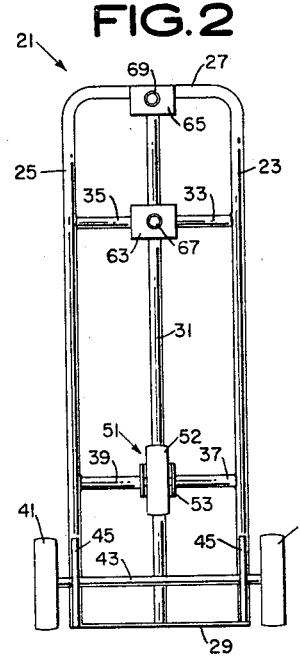
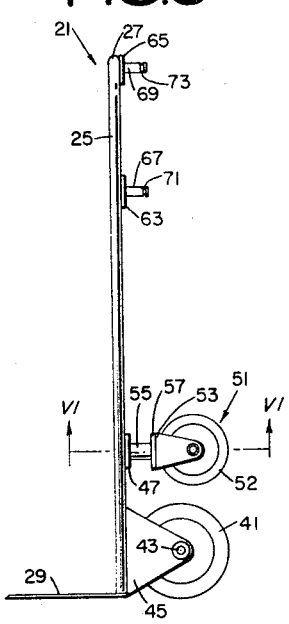
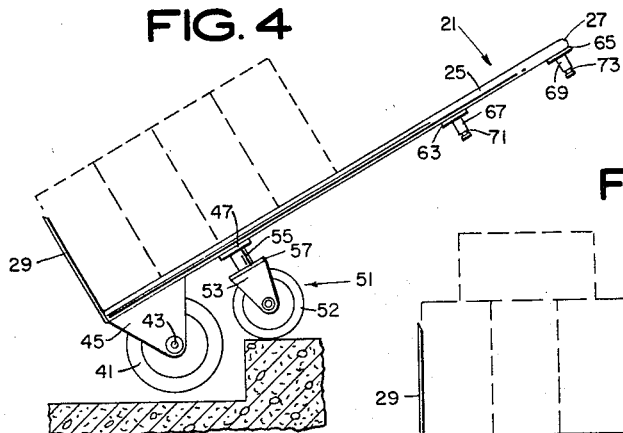
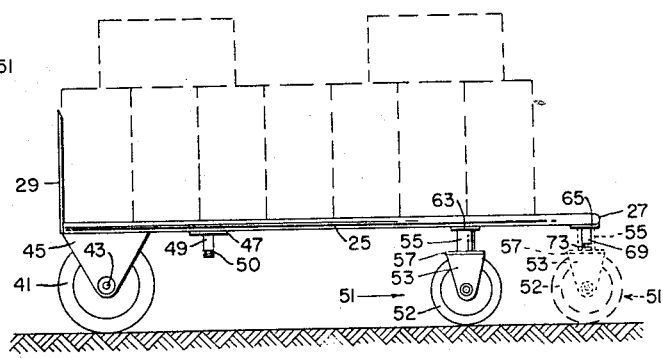
INVENTOR,
CUSTER E. CAPADALIS Nov. 19, 1968     C. E. CAPADALIS     3,411,798

MATERIAL HANDLING MEANS

Filed June 8, 1966     2 Sheets-Sheet 2

INVENTOR,
CUSTER E. CAPADALIS

United States Patent Office 3,411,798
Patented Nov. 19, 1968

3,411,798
MATERIAL HANDLING MEANS
Custer E. Capadalis, Memphis, Tenn.
(6038 Orchid Lane, Dallas, Tex. 75230)
Filed June 8, 1966, Ser. No. 556,177
2 Claims. (Cl. 280—5.32)

ABSTRACT OF THE DISCLOSURE

Material handling means comprising a hand truck having normal wheel means for rollably supporting material to be handled, and shiftable supplemental wheel means for acting as a fulcrum to assist in elevating the truck over obstacles such as curbs or the like or for attachment to a remote portion of the hand truck to enable it to be used in a horizontal position.

---

This invention relates to new and useful improvements in material handling devices, and more particularly to manually propelled trucks, dollies, and similar material handling devices employing auxiliary wheel means for facilitating the movement of the device over uneven terrain and over stairs and curbing.

There have been heretofore numerous hand trucks or hand dollies for carrying materials but none of these prior devices has been provided with effective means for moving the device easily over stairs, curbings and other ground level projections. The device of the present invention further provides a shiftable wheeled fulcrum means for shifting the load carried thereupon to relieve the operator thereof of undue and unnecessary muscular exertion when the device is moved upwardly over a obstacle. The shiftable wheeled fulcrum means of the device of the present invention may further be adapted for use as an axled truck to provide a towable trailer for motorized material handling vehicles.

The principal object of the present invention is to provide a manually operable material handling means having an auxiliary wheel rearwardly disposed above the support wheels for moving the material handling means over curbs, stairs and similar obstructions.

Another object of the present invention is to provide castering means for an auxiliary wheel carried by a material handling device.

A further object of the present invention is to provide means for a material handling device for disengageably attaching a caster wheel thereto.

Another object of the present invention is to provide means for converting an upright hand truck or dolly into a towable flat bed material handling device.

Another object of the present invention is to generally improve the design, construction and efficiency of material handling devices.

The means by which the foregoing and other objects of the present invention are accomplished and the manner of their accomplishment will be readily understood from the following specification upon reference to the drawings, in which:

FIG. 1 is a front elevational view of the device of the present invention.

FIG. 2 is a rear elevational view of the device of FIG. 1.

FIG. 3 is a side elevational view of the device of FIG. 1.

FIG. 4 is a side elevational view of the device of FIG. 1 as used relative to a curb or similar obstruction.

FIG. 5 is a side elevational view of the device of FIG. 1 converted to a flat bed trailer with the auxiliary wheel dotted in full extended condition.

Figure 7:
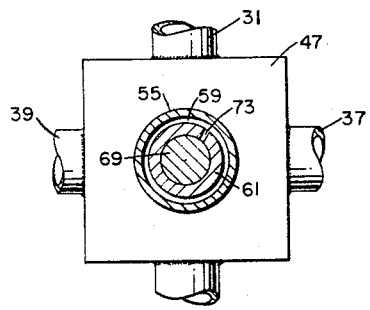
FIG. 7 is a further enlarged vertical cross sectional view of the device of FIG. 6 as taken on the line VII—VII of FIG. 6.

Referring now to the drawings in which the various parts are indicated by numerals, the embodiment of the present invention comprises a material handling truck 21 provided with a pair of oppositely spaced, substantially parallel side rails 23, 25, a top brace member 27 integrally attached to the uppermost ends of the side rails 23, 25 and spanning thereacross, and a base plate 29 rigidly affixed to the lowermost portion of the side rails 23, 25. The truck 21 is further provided with a vertical rod 31 spanning between the brace 27 and the base plate 29, substantially parallel to the side rails 23, 25 and interposed substantially centrally therebetween. To impart more rigidity to the structure, the truck 21 is additionally provided with a pair of lateral upper tie members 33, 35 and a similar lower pair of lateral ties 37, 39 laterally interposed between the side rails 23, 25 and the vertical rod 31 and securely attached to the side rails 23, 25 and the vertical rod 31 as by welding or the like as best illustrated in FIGS. 1 and 2 of the drawings. The hand truck 21 is provided with a pair of equi-distantly spaced conventional pneumatic tired wheels 41, mounted upon the outer extremities of an axle 43 journalled in a pair of substantially triangularly shaped bearing plates 45 rigidly attached to the rearward lowermost portions of the side rails 23, 25 of the hand truck 21.

The device of the present invention is further provided with a substantally rectangularly shaped anchor plate 47 rigidly attached to the hand truck 21 on its rearward face at the junction of the lower lateral tie members 37, 39 and the vertical rod 31. The plate 47 is provided with a substantially cylindrical shaft 49 rigidly attached thereto and extending rearwardly outwardly therefrom. The shaft 49 is provided somewhat inwardly of its distal extremity with a peripheral groove 50.

The present invention further comprises supplemental wheel means 51 provided with a wheel 52 somewhat smaller in diameter than the truck supporting wheels 41, journalled on a shaft carried by the caster 53. The caster 53 is provided with a substantially tubular sleeve 55 rigidly attached at one of its ends to the platform 57 of the caster 53 and extends outwardly therefrom. The tubular sleeve 55 is provided on its inner periphery somewhat inwardly of its proximal end with an inscribed race 59 and a split ring spring 61 in concentric partial embraceable engagement with the peripheral race 59.

The hand truck 21 is further provided with a substantially rectangularly formed plate 63 attached to the rearward face of the truck 21 at the junction formed by the vertical rod 31 and the upper tie members 33, 35 and a similar plate 65 attached to the truck 21 at the junction formed by the upper end of the vertical rod 31 and the top brace 27. The plates 63, 65 are provided with substantially cylindrical shaftings 67, 69 of similar configuration and dimension as the shaft 49. The shaftings 67, 69 are additionally provided with peripheral grooves 71, 73, similar to the peripheral groove 50 circumscribed around the shaft 49.

Figure 6:
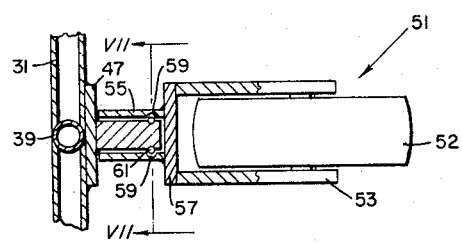
FIG. 6 is an enlarged cross sectional view of the device of FIG. 1 as taken on the line VI—VI of FIG. 3.

The internal diameter of the tubular sleeve 55 is somewhat larger than the external diameters of the shafts 49, 67, 69 to allow the sleeve 55 to fit circumferentially embraceably around any desired one of the shafts 47, 67, 69 as best illustrated in FIG. 6 of the drawings. It will thus be noted upon further reference to FIG. 6 of the drawings that the grooves 50, 71, 73 in the respective shafts 47, 67, 69 are adapted for positive peripheral alinement with the internal race 59 of the tubular sleeve 55 when any one of the shafts is inserted into the sleeve 55. When any one of the shafts is inserted into the tubular sleeve 55 the periphery of the distal end of the shaft urges the spring 61 against the race 59 to permit the distal end of the shaft to pass through the opening formed by the spring and therebeyond until the race 59 and the groove of the shaft are in circumferential alinement allowing the spring 61 to engage into the channel formed by the alinement of the race 59 and the groove of the shaft, to retain the shaft within the tubular sleeve in rotatable detachable engagement.

It will thus be readily seen that when it is desired to use the present device as a hand truck, as illustrated in FIG. 4 of the accompanying drawings, the tubular sleeve 55 is engaged with the lowermost shaft 49 placing the caster 53 and the wheel 51 in position slightly above the load bearing wheels 41 in such manner to allow the operator of the device to move the device over a step or curb utilizing the caster 53 and the wheel 51 as a fulcrum to provide the desired leverage for moving the hand truck 21 easily over the step or curb with minimal effort.

When it is desired to utilize the truck as a flat bed carrier as illustrated in FIG. 5 of the drawings the caster 53 may be attached to either the shaft 67 or the shaft 69, as hereinabove described, for movement of material over relatively flat terrain.

Figure 8:
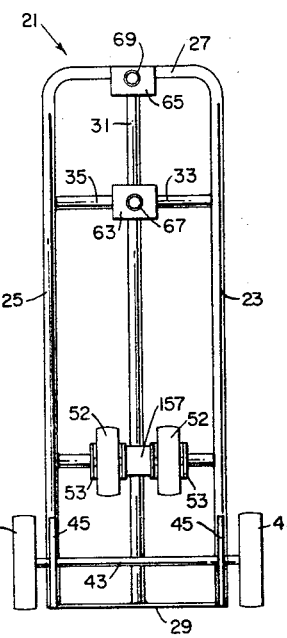
FIG. 8 is a rear elevational view of an alternate form of the device of FIG. 1 on the same scale as the device of FIG. 1.

A first alternate form of the device of the present invention, illustrated in FIG. 8 of the drawings, provides the basic hand truck 21 with a substantially elongated platform 157 for the mounting of a plurality of casterable wheels 51 rigidly thereon.

Figure 9:
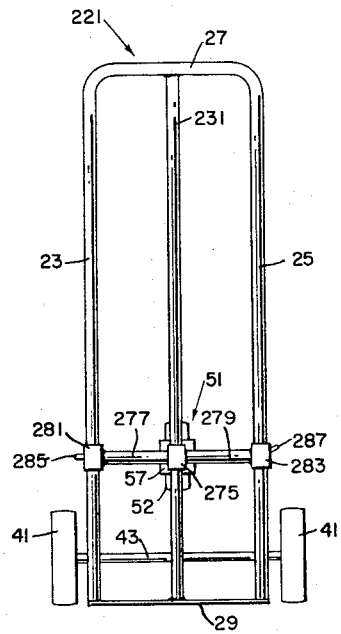
FIG. 9 is a front elevational view of a second alternate form of the device of FIG. 1.
Figure 10:
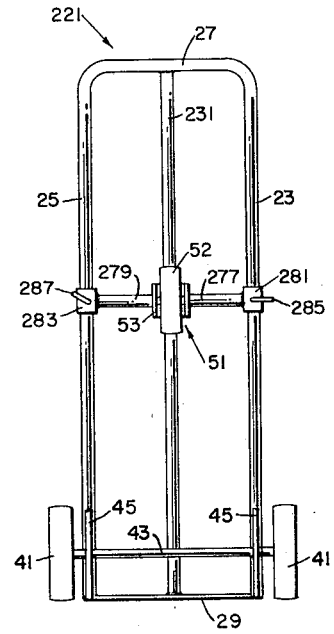
FIG. 10 is a rear elevational view of the device of FIG. 9 in an adjusted position.

A second alternate form of the embodiment of the present invention comprises a hand truck 221, illustrated in FIGS. 9, 10 of the drawings, provided with an uninterrupted vertical rod 231 in parallel spaced relation with the side rails 23, 25 and disposed equidistantly therebetween. The hand truck 221 is further provided with a third wheel 51 rotatably mounted in a caster 53 which is rigidly attached rearwardly of a cylindrical collar 275 in embraceable slidable engagement with the vertical rod 231. The second alternate form of the device of the present invention further comprises a pair of axially oppositely alined arms 277, 279, rigidly secured at their inner ends to the collar 275 as by welding or the like, and securely attached at their outwardly extending ends to a like pair of spaced apart substantially cylindrical collars 281, 283. The cylindrical collars 281, 283 are slidably affixed to the side rails 23, 25 and are provided with latch means 285, 287 for adjusting, positioning and locking the collars 281, 283, the alined arms 277, 279, and the attached wheel 51 and caster 53 along the side rails 23, 25. It will thus readily be seen, upon reference to FIGS. 9, 10 of the drawings that the wheel 51 may be quickly and easily moved and held at any pre-selected position on the side rails 23, 25 with relation to the load bearing wheels 41. When it is desired to convert the hand truck into a flat bed carrier, the auxiliary wheel 51 and its supporting structure may be moved along the side rails 23, 25 into a position wherein the collars 275, 281, 283 are substantially in adjacency with the top brace 27 of the hand truck 221.

I claim:

1. Material handling means in combination with a hand truck comprising a frame having side rails, a material supporting base plate attached to the lowermost end of said frame, wheel means mounted rearwardly of said base plate on said frame, rod means interposed between the top of said frame and said base plate substantially parallel to said side rails, a plurality of shaft means attached to said rod means at spaced apart intervals along said frame including lowermost shaft means adjacent but spaced above said base plate, at least one additional shaft means connected to said frame adjacent the upper end thereof, supplemental wheel means shiftably connected to said rod means by at least one of said shaft means, said supplemental wheel means including sleeve means for embraceable engagement and disengagement with said shaft means, bracket means attached to one end of said sleeve means, a wheel journalled in said bracket means, means to latchably engage and disengage said supplemental wheel means with a said shaft means, said sleeve means and said attached bracket and journalled wheel being rotatably disengageably latched to the lowermost of said shaft means to provide a fulcrum for supporting said material handling means in movement over a curbing or the like.

2. A device in accordance with claim 1, wherein said sleeve means and said attached bracket and journalled wheel are rotatably disengageably affixed to the uppermost of said shaft means to support said material handling means in a prone position.

References Cited

UNITED STATES PATENTS

| 119,025 | 9/1871 | French | 280—5.28 |
| 1,665,882 | 4/1928 | Jarvis et al. | 16—18 |
| 2,347,524 | 4/1944 | Swan. | |
| 2,513,604 | 7/1950 | Vandemark | 280—47.12 X |
| 2,543,948 | 3/1951 | Wiedman | 280—476 X |
| 2,820,643 | 1/1958 | Cohn | 280—47.27 X |
| 3,220,045 | 11/1965 | Teague et al. | 16—43 |
| 3,337,228 | 8/1967 | Shulkin | 280—47.27 |

FOREIGN PATENTS

| 11,195 | 1903 | Great Britain. |
| 259,080 | 6/1949 | Switzerland. |

LEO FRIAGLIA, *Primary Examiner.*